United States Patent
Abedini et al.

(10) Patent No.: US 10,129,838 B2
(45) Date of Patent: Nov. 13, 2018

(54) DISTRIBUTED DEVICE-TO-DEVICE SYNCHRONIZATION

(71) Applicant: QUALCOMM Incorporated, San Diego, CA (US)

(72) Inventors: Navid Abedini, Raritan, NJ (US); Nilesh Nilkanth Khude, Bridgewater, NJ (US); Saurabha Rangrao Tavildar, Jersey City, NJ (US); Sébastien Henri, Paris (FR); Junyi Li, Chester, NJ (US); Vincent Douglas Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 14/286,354

(22) Filed: May 23, 2014

(65) Prior Publication Data

US 2015/0341873 A1 Nov. 26, 2015

(51) Int. Cl.
*H04W 4/00* (2018.01)
*H04W 56/00* (2009.01)
(Continued)

(52) U.S. Cl.
CPC ..... *H04W 56/001* (2013.01); *H04W 56/0015* (2013.01); *H04W 72/04* (2013.01); *H04W 72/02* (2013.01)

(58) Field of Classification Search
CPC .................................................... H04W 48/16
(Continued)

(56) References Cited

U.S. PATENT DOCUMENTS 8,359,038 B2  1/2013  Hakola et al.
8,571,482 B2  10/2013 Hakola et al.
(Continued)

FOREIGN PATENT DOCUMENTS

EP       2665325 A1     11/2013
WO   WO-2011130630 A1  10/2011

OTHER PUBLICATIONS

ISA/EPO, International Search Report and Written Opinion of the International Searching Authority, Int'l. App. No. PCT/US2015/029075, dated Jul. 21, 2014, European Patent Office, Rijswijk, NL, 10 pgs.

(Continued)

*Primary Examiner* — Iqbal Zaidi
(74) *Attorney, Agent, or Firm* — Holland & Hart LLP

(57) ABSTRACT

Methods, systems, and devices are described that provide for D2D synchronization. The methods, systems, and/or devices may include tools and techniques that provide for synchronizing a mobile device based on detection of a reliability alarm. A reliability alarm may be used between mobile devices, which is transmitted and/or received on specific D2D resources. Since the resources are reserved for the reliability alarm, a mobile device which was previously isolated from network synchronization will be able to receive the reliability alarm that a reliable synchronization signal is close when it moves within range of a reliable device. Once a reliability alarm is received the mobile device may free other resources to allow it to receive synchronization signals from the reliable devices. The mobile device may then synchronize with the network based on the received synchronization signals and transmit its own reliability alarm for subsequent isolated devices to use.

26 Claims, 9 Drawing Sheets

(51) Int. Cl.
*H04W 72/04* (2009.01)
*H04W 72/02* (2009.01)

(58) Field of Classification Search
USPC .................................. 370/252–339; 455/509
See application file for complete search history.

(56) References Cited

U.S. PATENT DOCUMENTS

| | | |
|---|---|---|
| 2006/0259759 A1* | 11/2006 | Maino ..................... H04L 63/08 |
| | | 713/151 |
| 2013/0108000 A1 | 5/2013 | Park et al. |
| 2013/0336307 A1 | 12/2013 | Park et al. |
| 2014/0044036 A1 | 2/2014 | Kim et al. |
| 2014/0057670 A1* | 2/2014 | Lim ..................... H04W 8/005 |
| | | 455/509 |
| 2015/0056982 A1* | 2/2015 | Sorrentino ............ H04W 60/00 |
| | | 455/426.1 |
| 2016/0065362 A1* | 3/2016 | Choyi ................... H04L 63/065 |
| | | 380/279 |

OTHER PUBLICATIONS

IPEA/EPO, Second Written Opinion of the International Preliminary Examining Authority, Int'l. App. No. PCT/US2015/029075, dated May 11, 2016, European Patent Office, Rijswijk, NL, 6 pgs.

\* cited by examiner

DISTRIBUTED DEVICE-TO-DEVICE SYNCHRONIZATION

BACKGROUND

The following relates generally to wireless communication, and more specifically to device-to-device (D2D) synchronization. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. The base stations provide the devices within the coverage area with various services, like synchronization. The range of network synchronization can be further extended, if the (in-coverage) devices also transmit synchronization signals, based on the network timing, on some resources allocated for device-to-device communications. At times, clusters of collocated devices may become isolated from the rest of the network. When a mobile device, or group of mobile devices, moves outside the (extended) coverage area of all base stations associated with a communications network, the mobile devices may lose coverage, with a resultant loss of services provided by the communications network. The group of mobile devices may maintain some level of synchronization with one another, but as time progresses while they are isolated, the synchronization with the network may become unreliable. The group of mobile devices may use all of the available resources in a dense mobile device scenario. As a result, these mobile devices will not be able to receive any further synchronization signals on these occupied resources and may remain isolated, even if they move within range of a synchronization signal with reliable network timing.

SUMMARY

Described below are methods, systems, and devices that provide for D2D synchronization. A reliability alarm may be used between mobile devices, which is transmitted and/or received on specific D2D resources. Since the resources are reserved for the reliability alarm, a mobile device which was previously isolated from network synchronization will be able to receive the reliability alarm. The alarm may indicate that a reliable synchronization signal is close when the mobile device moves within range of a reliable device. Once a reliability alarm is received, the mobile device may free other resources to allow it to receive synchronization signals from the reliable devices. The mobile device may then synchronize with the network based on the received synchronization signals and transmit its own reliability alarm for subsequent isolated devices to use.

In some embodiments, a method for wireless synchronization includes receiving, at a mobile device, a reliability alarm on resources allocated for the reliability alarm, and synchronizing with a network based at least in part on the reliability alarm.

In some embodiments, an apparatus for wireless synchronization includes means for receiving, at a mobile device, a reliability alarm on resources allocated for the reliability alarm, and means for synchronizing with a network based at least in part on the reliability alarm.

In some embodiments, an apparatus for wireless synchronization includes a processor, memory in electronic communication with the processor, and instructions stored in the memory. The instructions may be executable by the processor to receive, at a mobile device, a reliability alarm on resources allocated for the reliability alarm, and synchronize with a network based at least in part on the reliability alarm.

In some embodiments, a computer-program product for wireless synchronization includes a non-transitory computer-readable medium storing instructions executable by a processor to receive, at a mobile device, a reliability alarm on resources allocated for the reliability alarm, and synchronize with a network based at least in part on the reliability alarm.

Various embodiments of the method, apparatuses, and/or computer program products may include the features of, means for, and/or processor-executable instructions for transmitting a reliability alarm on the resources allocated for the reliability alarm. In some cases, synchronizing with the network includes receiving synchronization signals on synchronization resources wherein the synchronization resources are made available based at least in part on the reliability alarm, and synchronizing with the network based at least in part on the synchronization signals. The reliability alarm may include an analog signal including at least one of a time offset and a counter. Transmitting the reliability alarm may include transmitting the reliability alarm for a number of synchronization periods while the mobile device is not synchronized with the network. In some cases, transmitting the reliability alarm includes transmitting the reliability alarm based on a probability of transmission.

Various embodiments of the method, apparatuses, and/or computer program products may include the features of, means for, and/or processor-executable instructions for determining that the reliability alarm exceeds a threshold. The resources allocated for the reliability alarm may include device-to-device (D2D) resources. In some cases, the synchronization resources include at least some of the device-to-device (D2D) resources not reserved for the reliability alarm.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Device-to-device synchronization in a wireless communications system is described. When a mobile device, and/or cluster of mobile devices, becomes isolated from network synchronization signals, a catalyst may be needed for the mobile device to become aware of the presence of a reliable timing signal. By using a reliability alarm on specific resources allocated for the reliability alarm, a mobile device is able to detect when a reliable timing signal is present, even if the rest of its D2D resources are occupied by communications with other mobile devices. Once a reliability alarm is detected, the mobile device may free D2D resources to enable reception of synchronization signals over the resources. The mobile device may begin to transmit its own reliability alarm for a certain number of synchronization periods according to a probability of transmission before it is synchronized and/or as it is attempting to synchronize. If the mobile device is able to receive synchronization signals over the freed resources, it may use the signals to synchronize with the network. Once the mobile device is synchronized with the network, it may transmit a reliability alarm during the allocated resources while it remains synchronized for other isolated or unreliable mobile devices to detect.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
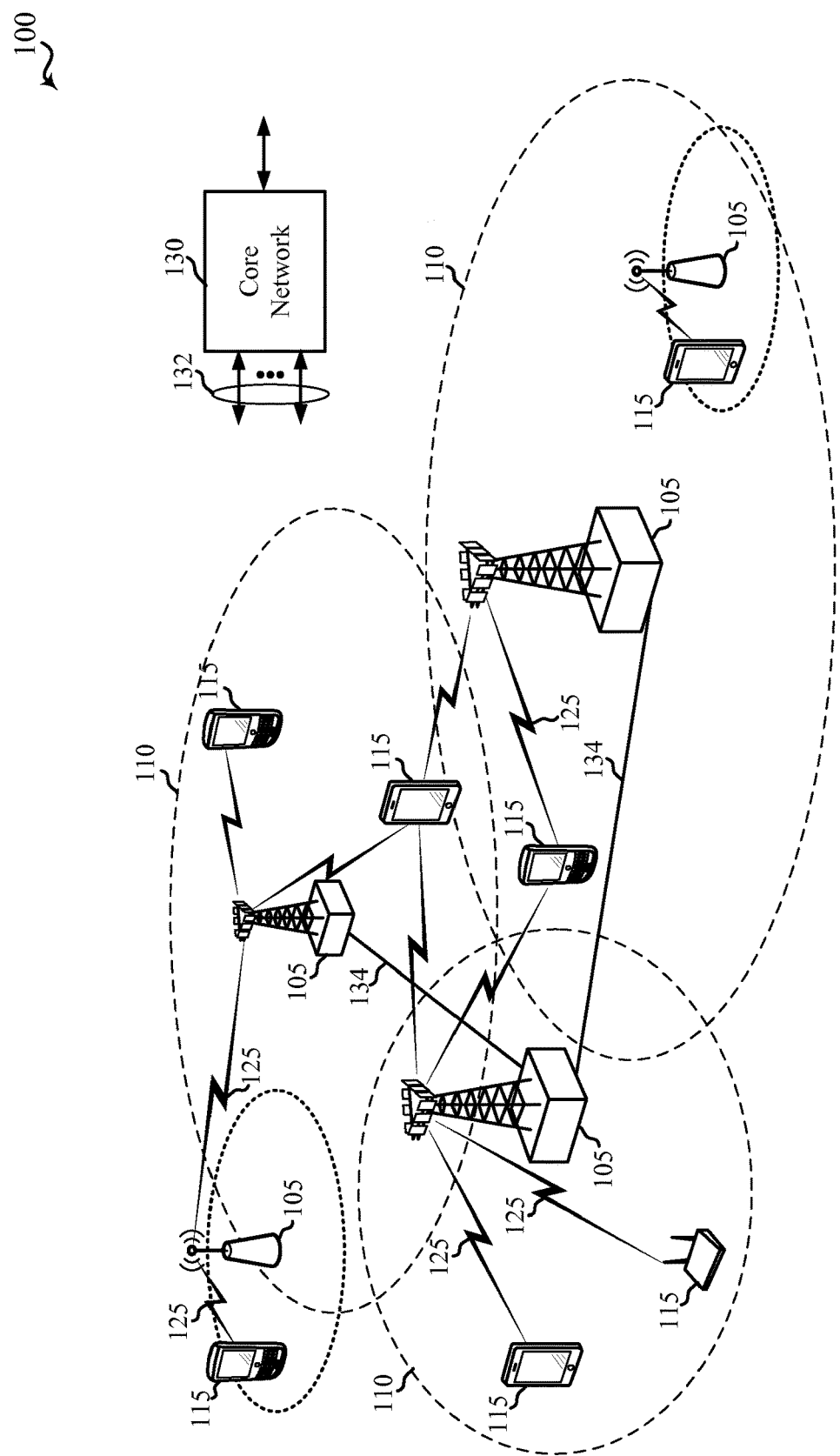
FIG. 1 shows a wireless communications system in accordance with various embodiments.

FIG. 1 shows a diagram illustrating an example of a wireless communications system 100 in accordance with various aspects of the present disclosure. The wireless communication system 100 includes a plurality of base stations 105 (e.g., evolved NodeBs (eNBs), wireless local area network (WLAN) access points, or other access points), a number of mobile devices 115, and a core network 130. Some of the base stations 105 may communicate with the mobile devices 115 under the control of a base station controller (not shown), which may be part of the core network 130 or certain ones of the base stations 105 in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., pilot symbols, reference signals, control channels, etc.), overhead information, data, etc. The system 100 may be a multi-carrier long-term evolution (LTE) network capable of efficiently allocating network resources.

The base stations 105 may wirelessly communicate with the mobile devices 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for a base station 105 may be divided into sectors making up only a portion of the coverage area (not shown). The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the base stations may have similar frame and/or gating timing, and transmissions from different base stations may be approximately aligned in time. For asynchronous operation, the base stations may have different frame and/or gating timing, and transmissions from different base stations may not be aligned in time. The techniques described herein may be used for either synchronous or asynchronous operations.

The mobile devices 115 may be dispersed throughout the wireless communication system 100, and each mobile device 115 may be stationary or mobile. A mobile device 115 may also be referred to by those skilled in the art as a user equipment (UE), a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A mobile device 115 may be able to communicate with macro eNBs, pico eNBs, femto eNBs, relays, and the like. A mobile device 115 may also be able to communicate over different types of access networks, such as cellular or other wireless wide area network (WWAN) access networks, or WLAN access networks. In some modes of communication with a mobile device 115, communication may be conducted over a plurality of communication links 125 or channels (i.e., component carriers), with each channel or component carrier being established between the mobile device and one of a number of cells (e.g., serving cells, which in some cases may be different base stations 105).

The communication links 125 shown in wireless communication system 100 may include uplink channels (or component carriers) for carrying uplink (UL) communications (e.g., transmissions from a mobile device 115 to a base station 105) and/or downlink channels (or component carriers) for carrying downlink (DL) communications (e.g., transmissions from a base station 105 to a mobile device 115). The UL communications or transmissions may also be called reverse link communications or transmissions, while the DL communications or transmissions may also be called forward link communications or transmissions.

In certain examples of the present disclosure, a mobile device 115 may perform network synchronization such as when a cluster of collocated devices gets isolated from the rest of the network. The mobile device 115 may recognize that synchronization information is available by detecting a signal on resources set aside for synchronization. In some cases, the resources are used by mobile devices 115 synchronized with a base station 105 are used to transmit a reliability alarm. In some embodiments, the mobile device 115 is not synchronized with the network, such as through the base station 105, and may receive reliability alarms from other, at times synchronized, mobile devices 115. The reliability alarm may prompt a synchronization procedure by the isolated mobile device 115 to allow for synchronization. Once synchronized, a mobile device 115 may then transmit a reliability alarm to subsequent mobile devices 115.

Figure 2:
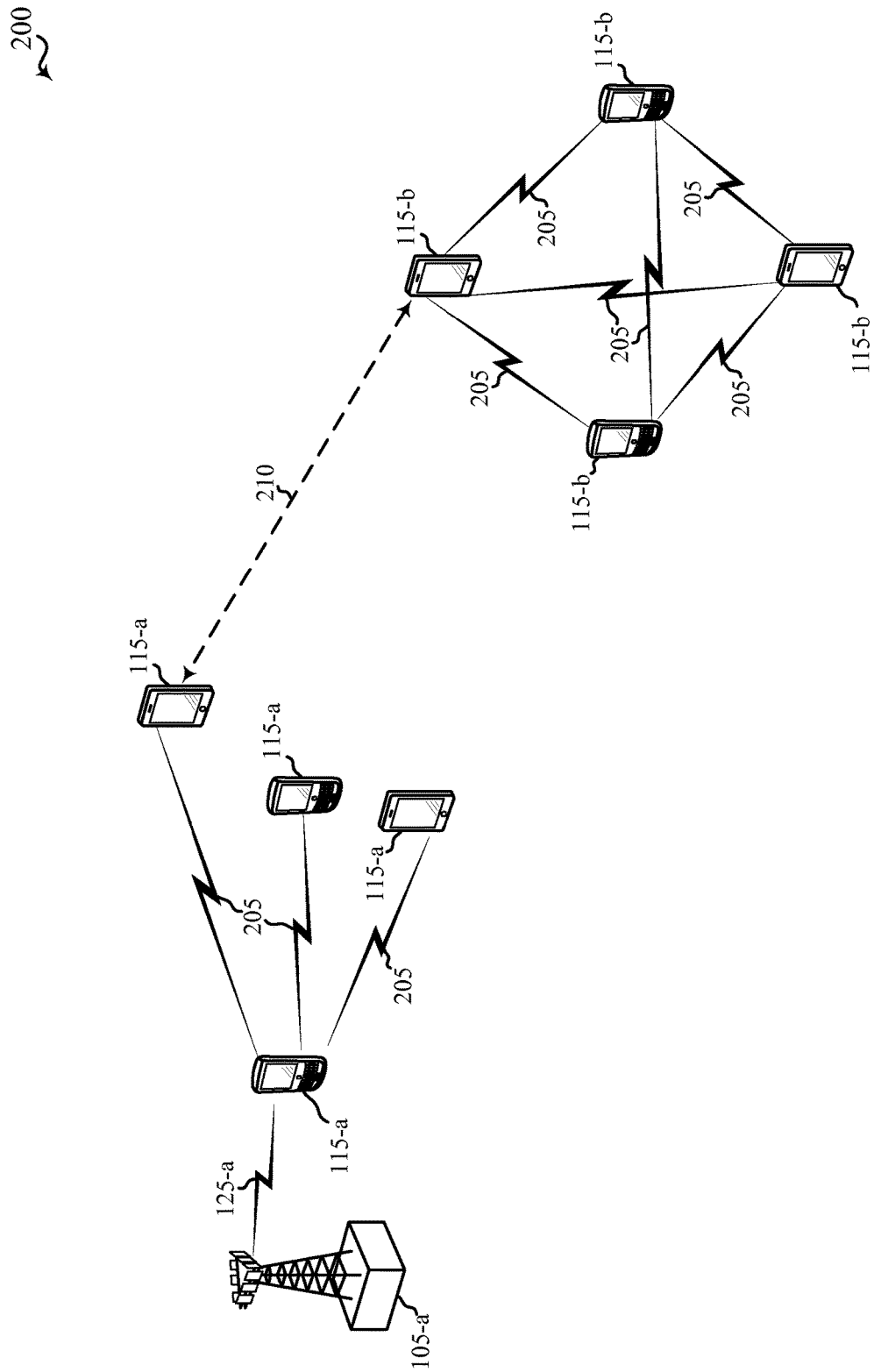
FIG. 2 shows an illustration of an example wireless communication system in accordance with various embodiments.

FIG. 2 shows a diagram illustrating an example of a wireless communications system 200 in accordance with various aspects of the present disclosure. The wireless communication system 200 includes a base station 105-a and a plurality of mobile devices 115-a and 115-b. The base station 105-a may be an example of the base station 105 of FIG. 1. The mobile devices 115-a and/or 115-b may be examples of the mobile devices 115 of FIG. 1.

The system 200 may include mobile devices 115-a which are synchronized with the network, such as through the base station 105-a. In some cases, the mobile devices 115-a form a synchronized cluster. Within the synchronized cluster one mobile device 115-a may forward synchronization information to other mobile devices 115-b through a device-to-device (D2D) communication link 205.

At times, a cluster of mobile devices 115-b may become an isolated cluster. A cluster may become isolated if the cluster does not have, or loses, a connection with an external timing source (e.g., wide area network (WAN), global positioning system (GPS)). In some cases, such as in a dense wireless communications environment, D2D resources may be fully used within a cluster, such as for communications between the mobile devices 115-b of the cluster. As a result, the cluster may be unable to receive further synchronization signals from the rest of the network on these occupied resources, and may become isolated. Due to isolation, the timing of the isolated cluster of mobile devices 115-b may become unreliable and unable to further resolve their residual time and frequency offsets to the external timing reference. Further, since available resources may be occupied, such as for communication within the isolated cluster, the cluster may have difficulties recognizing and/or merging with other clusters with reliable timing. Therefore, even if a reliable timing signal becomes available to the isolated cluster, it may not recognize the signal is present and remain isolated.

By using a signal, such as a reliability alarm 210, the isolated cluster of mobile devices 115-b may be aware of a reliable synchronization signal if one becomes available. A reliability alarm 210 may be transmitted using reserved resources, such as reserved D2D resources. By using reserved resources, an isolated mobile device 115-b may receive the reliability alarm 210 even when the rest of D2D resources are used up for communicating with other mobile devices 115-b, such as mobile devices 115-b of its cluster.

A mobile device 115-a that can detect the existence of reliable timing in their neighborhood may transmit, or broadcast, the reliability alarm 210. An unreliable mobile device 115-b may free resources, such as upon receiving a reliability alarm 210, which may be used for synchronization. By freeing resources, an unreliable mobile device 115-b may receive synchronization signals on available resources, such as on the recently freed resources, which may be used to synchronize the mobile device 115-b with the network and/or external timing reference.

Figure 3:
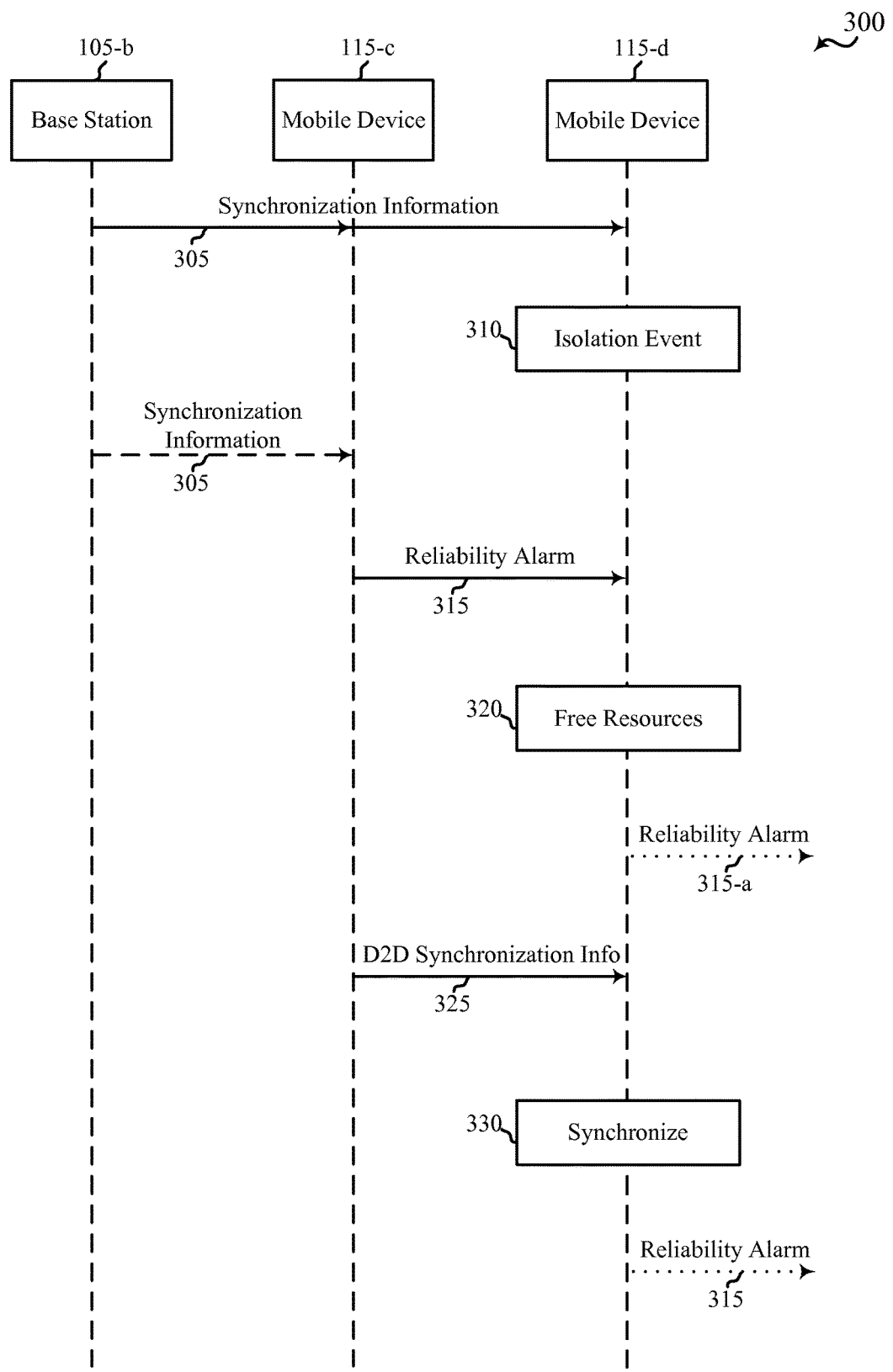
FIG. 3 shows a call flow diagram that illustrates an example of device-to-device (D2D) synchronization in a wireless communication system in accordance with various embodiments.

FIG. 3 shows a call-flow diagram 300, which illustrates, according to some embodiments, communication within a system configured for D2D synchronization. FIG. 3 shows communication between a base station 105-b and mobile devices 115-c and 115-d. The base station 105-b may be an example of the base station 105 of FIG. 1. The mobile devices 115-c and 115-d may be an example of the mobile devices 115 of FIG. 1.

Synchronization information 305 may be transmitted from the base station 105-b to the mobile devices 115-c and 115-d. The synchronization information 305 may include timing information for a network, such as a WLAN or GPS network. The mobile device 115-d may undergo an isolation event 310, causing the mobile device 115-d to become isolated from the network and/or synchronization information. The isolation event 310 may occur due the mobile device 115-d moving to a location where it is no longer able to receive the synchronization information 305 from the base station 105-b and/or synchronization information from a mobile device 115-c that is considered to have reliable timing. In some cases, an isolation event 310 occurs because the mobile device 115-d is unable to receive synchronization information from the network, such as the base station 105-b, and is unable to receive synchronization information from another mobile device 115-c because all D2D resources are used, such as for communication with other mobile devices 115. Other events may occur which result in the mobile device 115-d being isolated from synchronization signals from the network but are not detailed for the sake of brevity.

The mobile device 115-c may remain synchronized with the network, such as by continuing to receive synchronization information 305 from the base station 105-*b*. The mobile device 115-*c*, since it is still synchronized with the network, may transmit a reliability alarm 315. If the isolated mobile device 115-*d* is within D2D communication range of the synchronized mobile device 115-*c* it may receive the reliability alarm 315. The reliability alarm 315 may be transmitted and/or received on resources reserved for the reliability alarm 315. In some cases, the reliability alarm 315 is an analog signal, which may allow energy-based detection. The reliability alarm 315 may include a time offset, at least one counter, and/or other information relating to synchronization. In some embodiments, the reliability alarm 315 is transmitted on a single block, such as one symbol in an OFDM system, and may be within D2D synchronization resources.

In some cases, the isolated mobile device 115-*d* may compare the signal strength of the reliability alarm 315 to a threshold. If the reliability alarm 315 exceeds the threshold, the isolated mobile device 115-*d* may continue analyzing the reliability alarm 315 and/or other signals from the mobile device 115-*c*. If the reliability alarm 315 does not exceed the threshold, the isolated mobile device 115-*d* may not process the reliability alarm 315, and continue to monitor the reserved resources until a reliability alarm 315 is received which does exceed the threshold.

The isolated mobile device 115-*d* may free resources 320, such as by not transmitting signals during the resources, so that synchronization signals may be received during the resources. In some cases, the freed resources are all or a subset of the D2D resources. In some cases, the isolated mobile device 115-*d* may begin to transmit a reliability alarm 315-*a* upon reception of another reliability alarm 315, such as a reliability alarm 315 which exceeds the threshold. The isolated mobile device 115-*d* may transmit the reliability alarm 315-*a* for a number, such as T where T exceeds zero, of consecutive synchronization periods. In some cases, while the isolated mobile device 115-*d* still has unreliable timing and/or is not synchronized, the reliability alarm 315-*a* may be transmitted based on a probability of transmission. In some embodiments, the mobile device 115-*d* will only transmit the reliability alarm if it is scheduled to participate in synchronization transmissions.

The isolated mobile device 115-*d* may receive D2D synchronization information 325 from the synchronized mobile device 115-*c*. The D2D synchronization information 325 may be received using the free resources 320. The D2D synchronization information may include a time and/or frequency offset or any other information which may help the isolated mobile device 115-*d* synchronize with the synchronized mobile device 115-*c* and/or the network, such as through the base station 105-*b*.

The mobile device 115-*d* may synchronize 330 with the synchronized mobile device 115-*c* and/or the network, such as through the base station 105-*b*. In some cases, the received D2D synchronization information 325 is used to synchronize 330 the mobile device 115-*d*.

The mobile device 115-*d* may transmit a reliability alarm 315. The reliability alarm 315 may be received by and/or used for subsequent mobile devices 115 to become aware of a mobile device 115-*d* with reliable timing.

Figure 4A:
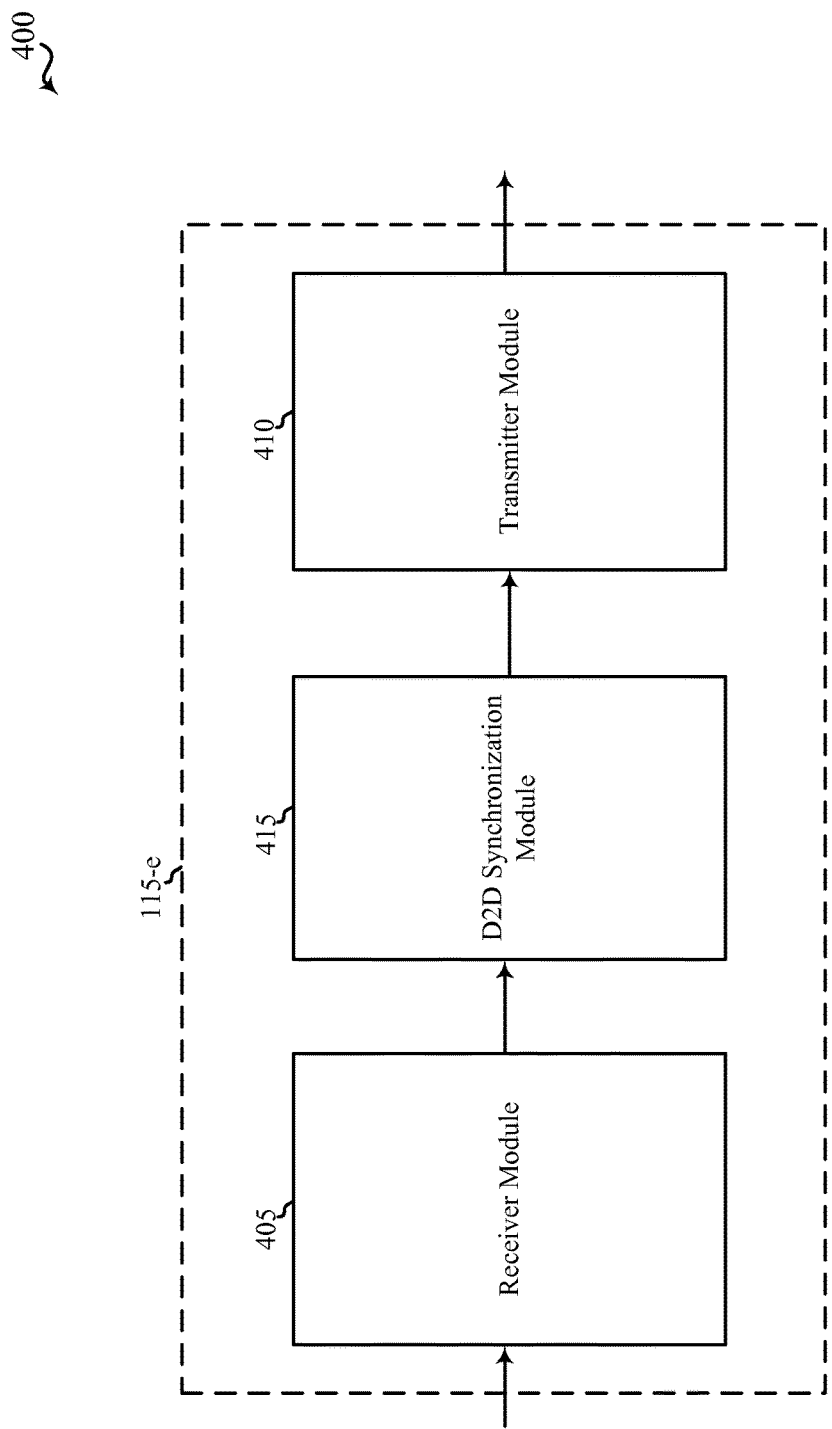
FIGS. 4A and 4B show block diagrams of an example device(s) that may be employed in wireless communications systems in accordance with various embodiments.

FIG. 4A shows a block diagram illustrating a device 400 configured for D2D synchronization in accordance with various embodiments. The device 400 may be a mobile device 115-*e*, which may be an example of a mobile device 115 of FIG. 1. The device 400 may be an example of a base station 105 of FIG. 1. In some embodiments, the device 400 is a processor. The device 400 may include a receiver module 405, a D2D synchronization module 415, and/or a transmitter module 410. In some cases, the receiver module 405 and the transmitter module 410 are a single, or multiple, transceiver module(s). The receiver module 405 and/or the transmitter module 410 may include an integrated processor; they may also include an oscillator and/or a timer. The receiver module 405 may receive signals from base stations 105 and/or mobile devices 115. The receiver module 405 may perform operations, or parts of operations, of the system and call flow described above in FIG. 3, including receiving synchronization information 305, receiving a reliability alarm 315, and/or receiving D2D synchronization information 325. The transmitter module 410 may transmit signals to base stations 105 and/or mobile devices 115. The transmitter module 410 may perform operations, or parts of operations, of the system and call flow described above in FIG. 3, such as sending synchronization information 305, sending a reliability alarm 315, and/or sending D2D synchronization information 325.

The device 400 may include a D2D synchronization module 415. The D2D synchronization module 415 may include an integrated processor. The D2D synchronization module 415 may synchronize with other devices and/or let other devices know that it is synchronized. The D2D synchronization module 415 may receive and/or analyze reliability alarms from synchronized devices. The D2D synchronization module 415 may determine that an isolation event has occurred. Further, the D2D synchronization module 415 may free resources, such as to receive synchronization information. The D2D synchronization module 415 may analyze and/or synchronize with synchronization information, such as D2D synchronization information. The D2D synchronization module 415 may prepare a reliability alarm to be transmitted. The D2D synchronization module 415 may include a database. The database may store information relating to base stations 105, mobile devices 115, channel conditions, thresholds, and/or synchronization information.

By way of illustration, the device 400, through the receiver module 405, the D2D synchronization module 415, and the transmitter module 410, may perform operations, or parts of operations, of the system described above with reference to FIG. 2 and/or the system and call flow described above with reference to FIG. 3, including transmitting and/or receiving synchronization information 305 and/or D2D synchronization information 325, determining and/or recognizing an isolation event 310, transmitting and/or receiving a reliability alarm 315, freeing resources 320, and/or synchronizing 330, such as with synchronization information 305 and/or D2D synchronization information 325.

Figure 4B:
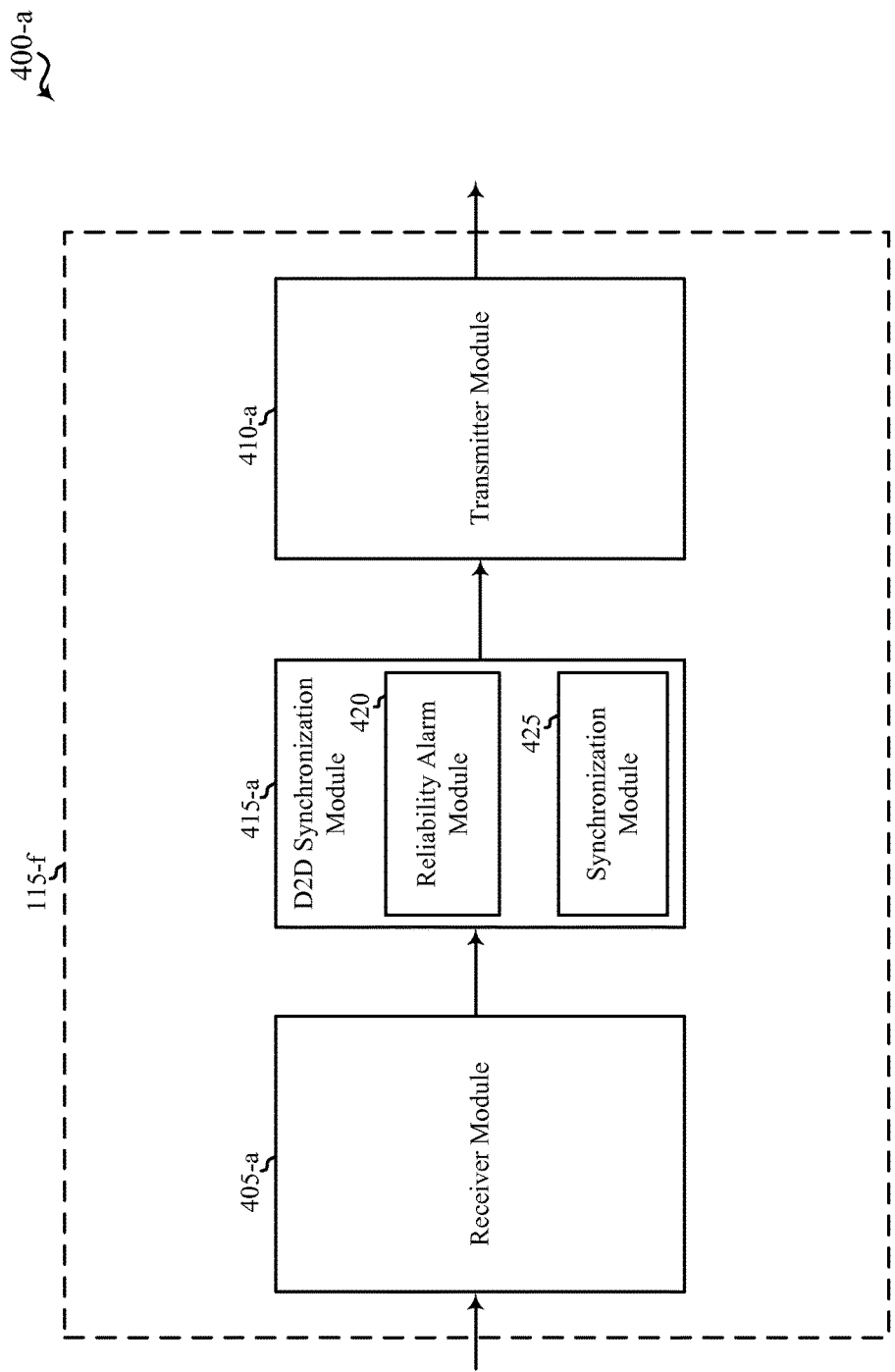

FIG. 4B shows a block diagram of a device 400-*a* configured for D2D synchronization in accordance with various embodiments. The device 400-*a* may be an example of the device 400 of FIG. 4A; and the device 400-*a* may perform the same or similar functions as described above for device 400. In some embodiments, the device 400-*a* is a mobile device 115-*f*, which may include one or more aspects of the mobile devices 115 described above with reference to any or all of FIGS. 1, 2, 3, and 4A. In some embodiments, the device 400-*a* is an example of a base station 105 described above with reference to any or all of FIGS. 1, 2, 3, and 4A. The device 400-*a* may also be a processor. In some cases, the device 400-*a* includes a receiver module 405-*a*, which may be an example of the receiver module 405 of FIG. 4A; and the receiver module 405-*a* may perform the same or similar functions as described above for receiver module 405. In some cases, the device 400-*a* includes a transmitter module 410-*a*, which may be an example of the transmitter module 410 of FIG. 4A; and the transmitter module 410-*a* may perform the same or similar functions as described above for transmitter module 410.

In some embodiments, the device 400-*a* includes a D2D synchronization module 415-*a*, which may be an example of the D2D synchronization module 415 of FIG. 4A. The D2D synchronization module 415-*a* may include a reliability alarm module 420. The reliability alarm module 420 may perform operations, or parts of operations, of the system and call flow described above in FIG. 3, such as analyzing and/or preparing a reliability alarm 315 and/or determining and/or recognizing an isolation event 310.

In some embodiments, the device 400-*a* includes a synchronization module 425. The synchronization module 425 may perform operations, or parts of operations, of the system and call flow described above in FIG. 3, such as analyzing and/or preparing synchronization information, such as synchronization information 305 and/or D2D synchronization information 325, freeing resources 320, and/or synchronizing 330.

According to some embodiments, the components of the devices 400 and/or 400-*a* are, individually or collectively, implemented with at least one application-specific integrated circuit (ASIC) adapted to perform some or all of the applicable functions in hardware. In other embodiments, the functions of device 400 and/or 400-*a* are performed by at least one processing unit (or core), on at least one integrated circuit (IC). In other embodiments, other types of integrated circuits are used (e.g., Structured/Platform ASICs, field-programmable gate arrays (FPGAs), and other Semi-Custom ICs), which may be programmed in any manner known in the art. The functions of each unit may also be implemented, in whole or in part, with instructions embodied in a memory, formatted to be executed by at least one general or application-specific processor.

Figure 5:
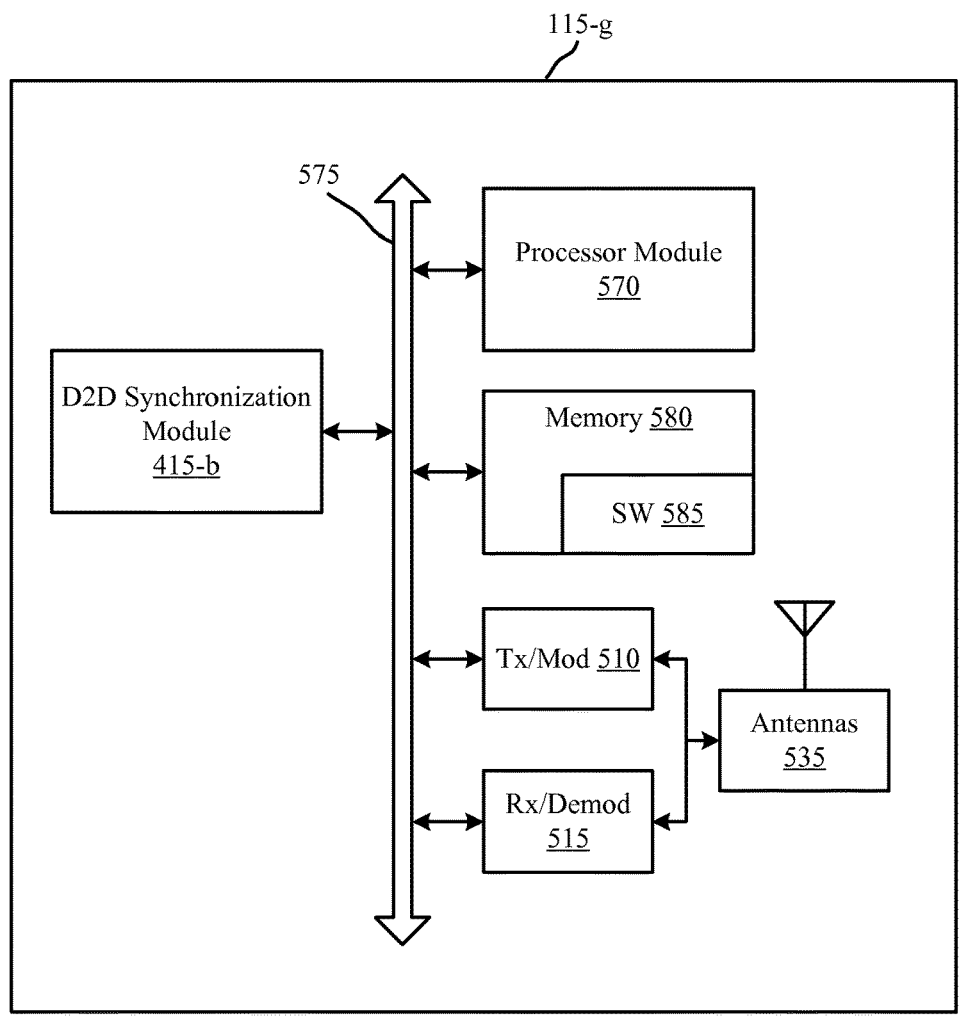
FIG. 5 shows a block diagram of a mobile device configured for D2D synchronization in accordance with various embodiments.

FIG. 5 is a block diagram 500 of a mobile device 115-*g* configured for D2D synchronization, in accordance with various embodiments. The mobile device 115-*g* may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The mobile device 115-*g* may have an internal power supply (not shown), such as a small battery, to facilitate mobile operation. In some embodiments, the mobile device 115-*g* may be an example of the mobile devices 115 of FIGS. 1, 2, 3, 4A and/or 4B.

The mobile device 115-*g* may generally include components for bi-directional voice and data communications including components for transmitting communications and components for receiving communications. The mobile device 115-*g* may include a processor module 570, a memory 580, transmitter/modulators 510, receiver/demodulators 515, and one or more antenna(s) 535, which each may communicate, directly or indirectly, with each other (e.g., via at least one bus 575). The mobile device 115-*g* may include multiple antennas 535 capable of concurrently transmitting and/or receiving multiple wireless transmissions via transmitter/modulator modules 510 and receiver/demodulator modules 515. For example, the mobile device 115-*g* may have X antennas 535, M transmitter/modulator modules 510, and R receiver/demodulators 515. The transmitter/modulator modules 510 may be configured to transmit signals via at least one of the antennas 535 to base stations 105 and/or other mobile devices 115. The transmitter/modulator modules 510 may include a modem configured to modulate packets and provide the modulated packets to the antennas 535 for transmission. The receiver/demodulators 515 may be configured to receive, perform RF processing, and demodulate packets received from at least one of the antennas 535. In some examples, the mobile device 115-*g* may have one receiver/demodulator 515 for each antenna 535 (i.e., R=X), while in other examples R may be less than or greater than X. The transmitter/modulators 510 and receiver/demodulators 515 may be capable of concurrently communicating with multiple base stations 105 and/or mobile devices 115 via multiple MIMO layers and/or component carriers.

According to the architecture of FIG. 5, the mobile device 115-*g* may also include D2D synchronization module 415-*b*. By way of example, D2D synchronization module 415-*b* may be a component of the mobile device 115-*g* in communication with some or all of the other components of the mobile device 115-*g* via bus 575. Alternatively, functionality of the D2D synchronization module 415-*b* may be implemented as a component of the transmitter/modulators 510, the receiver/demodulators 515, as a computer program product, and/or as at least one controller element of the processor module 570.

The memory 580 may include random access memory (RAM) and read-only memory (ROM). The memory 580 may store computer-readable, computer-executable software/firmware code 585 containing instructions that are configured to, when executed, cause the processor module 570 to perform various functions described herein (e.g., determine an isolation event, analyze a reliability alarm, analyze synchronization information, free resources, synchronize, etc.). Alternatively, the software/firmware code 585 may not be directly executable by the processor module 570 but be configured to cause a computer (e.g., when compiled and executed) to perform functions described herein.

The processor module 570 may include an intelligent hardware device, e.g., a central processing unit (CPU), a microcontroller, an application-specific integrated circuit (ASIC), etc. The mobile device 115-*a* may include a speech encoder (not shown) configured to receive audio via a microphone, convert the audio into packets (e.g., 20 ms in length, 30 ms in length, etc.) representative of the received audio, provide the audio packets to the transmitter/modulator module 510, and provide indications of whether a user is speaking.

The mobile device 115-*g* may be configured to implement aspects discussed above with respect to mobile devices 115 of FIGS. 1, 2, 3, 4A and/or 4B, and may not be repeated here for the sake of brevity. Thus, D2D synchronization module 415-*b* may include the modules and functionality described above with reference to D2D synchronization module 415 of FIG. 4A and/or D2D synchronization module 415-*a* of FIG. 4B. Additionally or alternatively, D2D synchronization module 415-*b* may perform the method 700 described with reference to FIG. 7 and/or the method 800 described with reference to FIG. 8.

Figure 6:
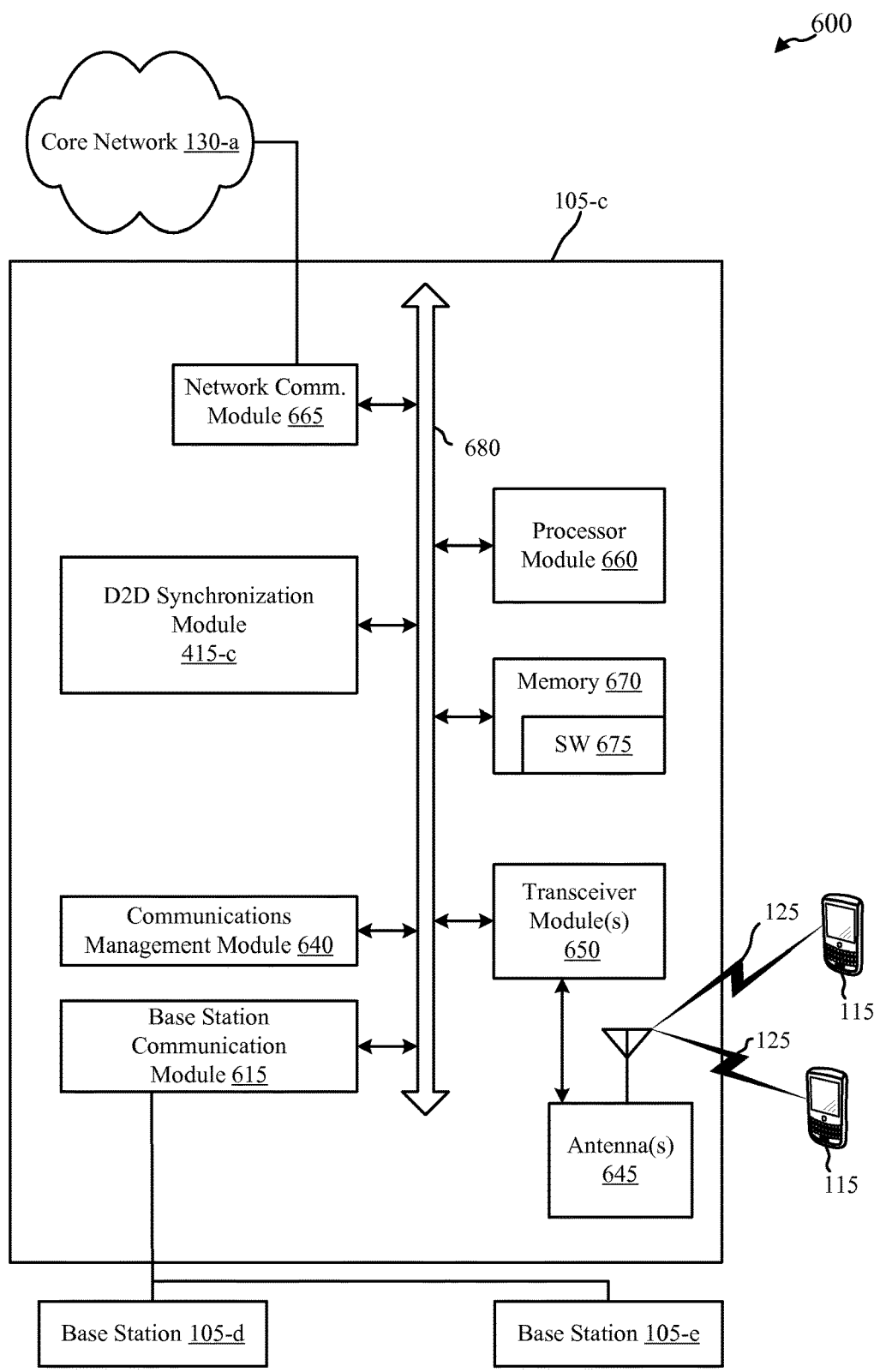
FIG. 6 shows a block diagram of a communications system that may be configured for D2D synchronization in accordance with various embodiments.

FIG. 6 shows a block diagram of a communications system 600 that may be configured for D2D synchronization in accordance with various embodiments. This system 600 may be an example of aspects of the systems 100, 200, or 300 depicted in FIG. 1, FIG. 2, or FIG. 3. The system 600 includes a base station 105-*c* configured for communication with mobile devices 115 over wireless communication links 125. The base station 105-*c* may be capable of communicating over one or more component carriers and may be capable of performing carrier aggregation using multiple component carriers for a communication link 125. The base station 105-c may be, for example, a base station 105 as illustrated in system 100, 200, or 300, or devices 400 or 400-a.

In some cases, the base station 105-c may have one or more wired backhaul links. The base station 105-c may be, for example, an LTE eNB 105 having a wired backhaul link (e.g., S1 interface, etc.) to the core network 130-a. The base station 105-c may also communicate with other base stations, such as base station 105-d and base station 105-e via inter-base station communication links (e.g., X2 interface, etc.). Each of the base stations 105 may communicate with mobile devices 115 using the same or different wireless communications technologies. In some cases, the base station 105-c may communicate with other base stations such as 105-d and/or 105-e utilizing base station communication module 615. In some embodiments, base station communication module 615 may provide an X2 interface within an LTE/LTE-A wireless communication network technology to provide communication between some of the base stations 105. In some embodiments, the base station 105-c may communicate with other base stations through the core network 130-a. In some cases, the base station 105-c may communicate with the core network 130-a through network communications module 665.

The components for the base station 105-c may be configured to implement aspects discussed above with respect to base stations 105 of FIGS. 1, 2, 3, 4A, and/or 4B and may not be repeated here for the sake of brevity. For example, the base station 105-c may include D2D synchronization module 415-c, which may be an example of the D2D synchronization module 415 of FIG. 4.

The base station 105-c may include antennas 645, transceiver modules 650, memory 670, and a processor module 660, which each may be in communication, directly or indirectly, with each other (e.g., over bus system 680). The transceiver modules 650 may be configured to communicate bi-directionally, via the antennas 645, with the mobile devices 115, which may be multi-mode devices. The transceiver module 650 (and/or other components of the base station 105-c) may also be configured to communicate bi-directionally, via the antennas 645, with other base stations (not shown). The transceiver module 650 may include a modem configured to modulate the packets and provide the modulated packets to the antennas 645 for transmission, and to demodulate packets received from the antennas 645. The base station 105-c may include multiple transceiver modules 650, each with at least one associated antenna 645.

The memory 670 may include random access memory (RAM) and read-only memory (ROM). The memory 670 may also store computer-readable, computer-executable software code 675 containing instructions that are configured to, when executed, cause the processor module 660 to perform various functions described herein (e.g., determine an isolation event, transmit a reliability alarm, transmit synchronization information, etc.). Alternatively, the software 675 may not be directly executable by the processor module 660 but be configured to cause the computer, e.g., when compiled and executed, to perform functions described herein.

The processor module 660 may include an intelligent hardware device, e.g., a central processing unit (CPU), a microcontroller, an application-specific integrated circuit (ASIC), etc. The processor module 660 may include various special purpose processors such as encoders, queue processing modules, base band processors, radio head controllers, digital signal processors (DSPs), and the like.

According to the architecture of FIG. 6, the base station 105-c may further include a communications management module 640. The communications management module 640 may manage communications with other base stations 105. The communications management module 640 may include a controller and/or scheduler for controlling communications with mobile devices 115 in cooperation with other base stations 105. For example, the communications management module 640 may perform scheduling for transmissions to mobile devices 115 or various interference mitigation techniques such as beamforming and/or joint transmission.

Figure 7:
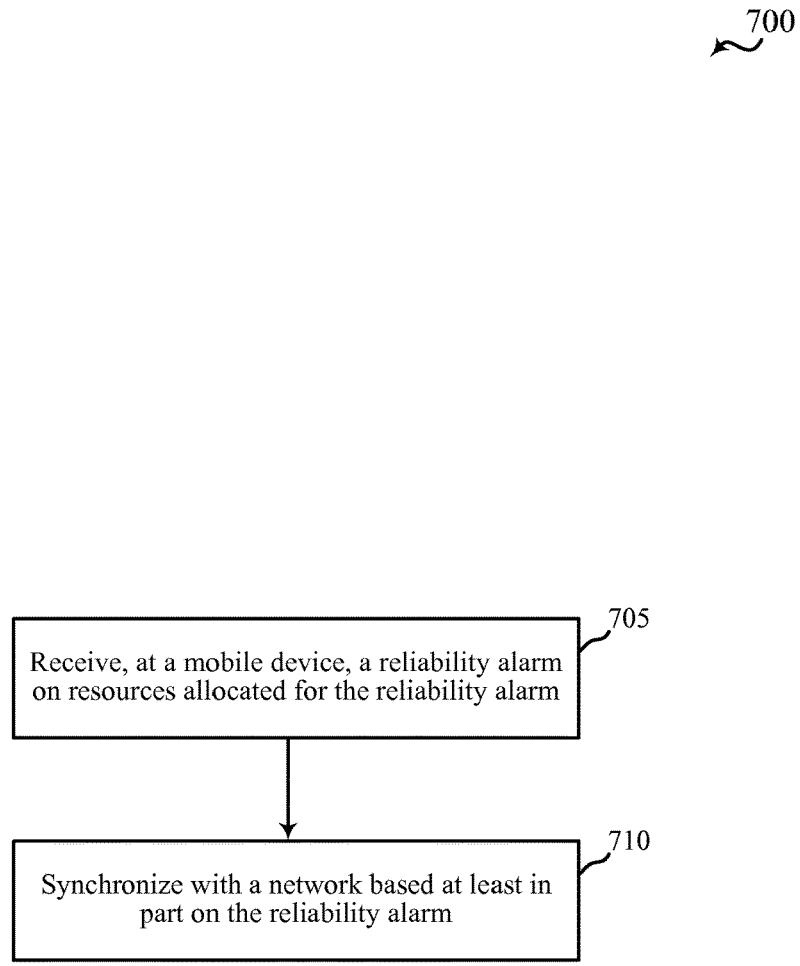
FIGS. 7 and 8 are flow diagrams that depict a method or methods of D2D synchronization in accordance with various embodiments.

FIG. 7 shows a flow diagram that illustrates a method 700 for D2D synchronization in accordance with various embodiments. The method 700 may be implemented using, for example, the devices, systems, and call flow(s) 100, 200, 300, 400, 400-a, 500, and 600 of FIGS. 1, 2, 3, 4A, 4B, 5, and 6.

At block 705, a mobile device 115 may receive a reliability alarm on resources allocated for the reliability alarm. For example, the operations at block 705 may be performed by: the D2D synchronization module 415 of FIG. 4A; the reliability alarm module 420 of FIG. 4B; and/or the device 500 of FIG. 5.

At block 710, a mobile device 115 may synchronize with a network based at least in part on the reliability alarm. For example, the operations at block 710 may be performed by: the D2D synchronization module 415 of FIG. 4A; the synchronization module 425 of FIG. 4B; and/or the device 500 of FIG. 5.

Figure 8:
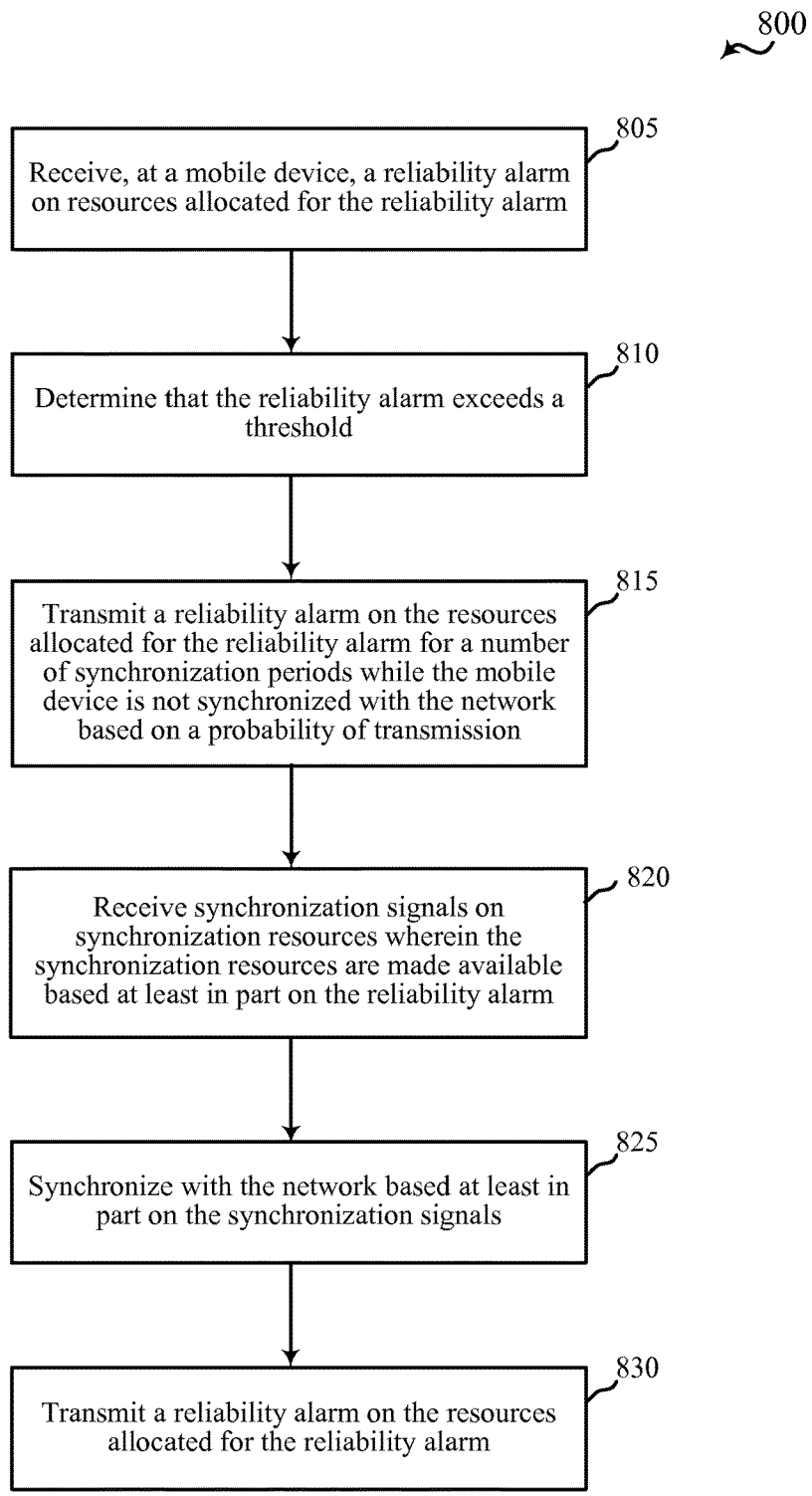

FIG. 8 shows a flow diagram that illustrates a method 800 for D2D synchronization in accordance with various embodiments. The method 800 may be implemented using, for example, the devices, systems, and call flow(s) 100, 200, 300, 400, 400-a, 500, and 600 of FIGS. 1, 2, 3, 4A, 4B, 5, and 6.

At block 805, a mobile device 115 may receive a reliability alarm on resources allocated for the reliability alarm. For example, the operations at block 805 may be performed by: the D2D synchronization module 415 of FIG. 4A; the reliability alarm module 420 of FIG. 4B; and/or the device 500 of FIG. 5.

At block 810, a mobile device 115 may determine that the reliability alarm exceeds a threshold. For example, the operations at block 810 may be performed by: the D2D synchronization module 415 of FIG. 4A; the reliability alarm module 420 of FIG. 4B; and/or the device 500 of FIG. 5.

At block 815, a mobile device 115 may transmit a reliability alarm on the resources allocated for the reliability alarm for a number of synchronization periods while the mobile device is not synchronized with the network based on a probability of transmission. For example, the operations at block 815 may be performed by: the D2D synchronization module 415 of FIG. 4A; the reliability alarm module 420 of FIG. 4B; and/or the device 500 of FIG. 5.

At block 820, a mobile device 115 may receive synchronization signals on synchronization resources wherein the synchronization resources are made available based at least in part on the reliability alarm. In some cases, the operations at block 820 may be performed by: the D2D synchronization module 415 of FIG. 4A; the synchronization module 425 of FIG. 4B; and/or the device 500 of FIG. 5.

At block 825, a mobile device 115 may synchronize with the network based at least in part on the synchronization signals. In some cases, the operations at block 825 may be performed by: the D2D synchronization module 415 of FIG. 4A; the synchronization module 425 of FIG. 4B; and/or the device 500 of FIG. 5.

At block 830, a mobile device 115 may transmit a reliability alarm on the resources allocated for the reliability alarm. In some cases, the operations at block 830 may be performed by: the D2D synchronization module 415 of FIG. 4A; the reliability alarm module 420 of FIG. 4B; and/or the device 500 of FIG. 5.

It will be apparent to those skilled in the art that the methods 700 and 800 are but example implementations of the tools and techniques described herein. The methods 700 and 800 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless synchronization comprising:
receiving, at a first mobile device that was previously isolated from receiving synchronization information of a network via a base station, a reliability alarm from a synchronized second mobile device on device-to-device (D2D) resources allocated for the reliability alarm, wherein the reliability alarm comprises an indication of reliable timing associated with synchronization of the second device and the network; and
receiving, at the first mobile device, synchronization signals on synchronization resources made available based at least in part on the reliability alarm; and
synchronizing with the network based at least in part on the reliability alarm and on the synchronization signals, wherein the reliability alarm comprises a time offset, or the synchronizing is further based at least in part on a time offset received from the second mobile device, or both.

2. The method of claim 1, wherein the reliability alarm comprises an analog signal comprising the time offset.

3. The method of claim 1, further comprising:
transmitting the reliability alarm on the D2D resources allocated for the reliability alarm.

4. The method of claim 3, wherein transmitting the reliability alarm comprises:
transmitting the reliability alarm for a number of synchronization periods while the first mobile device is not synchronized with the network.

5. The method of claim 4, wherein transmitting the reliability alarm comprises:
transmitting the reliability alarm based on a probability of transmission.

6. The method of claim 1, further comprising:
determining that the reliability alarm exceeds a threshold; and
allocating synchronization resources for synchronization based at least in part on the reliability alarm exceeding the threshold.

7. The method of claim 1, wherein the synchronization resources comprise at least some of the D2D resources not reserved for the reliability alarm.

8. The method of claim 1, wherein the reliability alarm comprises an analog signal comprising a counter.

9. A first mobile device for wireless synchronization comprising:
means for receiving, at the first mobile device that was previously isolated from receiving synchronization information of a network via a base station, a reliability alarm from a synchronized second mobile device on device-to-device (D2D) resources allocated for the reliability alarm, wherein the reliability alarm comprises an indication of reliable timing associated with synchronization of the second device and the network; and
means for receiving synchronization signals on synchronization resources made available based at least in part on the reliability alarm; and
means for synchronizing with the network based at least in part on the reliability alarm and the synchronization signals, wherein the reliability alarm comprises a time offset, or the synchronizing is further based at least in part on a time offset received from the second mobile device, or both.

10. The device of claim 9, wherein the reliability alarm comprises an analog signal comprising the time offset.

11. The device of claim 9, further comprising:
means for transmitting the reliability alarm on the D2D resources allocated for the reliability alarm.

12. The device of claim 11, wherein the means for transmitting the reliability alarm comprise:
means for transmitting the reliability alarm for a number of synchronization periods while the first mobile device is not synchronized with the network.

13. The device of claim 12, wherein the means for transmitting the reliability alarm comprises:
means for transmitting the reliability alarm based on a probability of transmission.

14. The device of claim 9, further comprising:
means for determining that the reliability alarm exceeds a threshold; and
means for allocating synchronization resources for synchronization based at least in part on the reliability alarm exceeding the threshold.

15. The device of claim 9, wherein the resources allocated for the reliability alarm comprise device-to-device (D2D) resources.

16. The device of claim 9, wherein the synchronization resources comprise at least some of the D2D resources not reserved for the reliability alarm.

17. A first mobile device for wireless synchronization comprising:
a processor;
memory in electronic communication with the processor; and
instructions stored in the memory, the instructions being executable by the processor to:
receive, at a first mobile device that was previously isolated from receiving synchronization information of a network via a base station, a reliability alarm from a synchronized second mobile device on device-to-device (D2D) resources allocated for the reliability alarm, wherein the reliability alarm comprises an indication of reliable timing associated with synchronization of the second device and the network; and
receive, at the first mobile device, synchronization signals on synchronization resources made available based at least in part on the reliability alarm; and synchronize with the network based at least in part on the reliability alarm and on the synchronization signals, wherein the reliability alarm comprises a time offset, or the synchronizing is further based at least in part on a time offset received from the second mobile device, or both.

18. The device of claim 17, wherein the reliability alarm comprises an analog signal comprising the time offset.

19. The device of claim 17, wherein the instructions are further executable by the processor to:
transmit the reliability alarm on the D2D resources allocated for the reliability alarm.

20. The device of claim 19, wherein transmitting the reliability alarm comprises:

transmitting the reliability alarm for a number of synchronization periods while the first mobile device is not synchronized with the network.

21. The device of claim 20, wherein transmitting the reliability alarm comprises:
transmitting the reliability alarm based on a probability of transmission.

22. The device of claim 17, wherein the instructions are further executable by the processor to:
determine that the reliability alarm exceeds a threshold; and
allocate synchronization resources for synchronization based at least in part on the reliability alarm exceeding the threshold.

23. The device of claim 17, wherein the synchronization resources comprise at least some of the D2D resources not reserved for the reliability alarm.

24. A non-transitory computer-readable medium storing instructions executable by a processor to:
receive, at a first mobile device that was previously isolated from receiving synchronization information of a network via a base station, a reliability alarm from a synchronized second mobile device on device-to-device (D2D) resources allocated for the reliability alarm, wherein the reliability alarm comprises an indication of reliable timing associated with synchronization of the second device and the network; and
receive, at the first mobile device, synchronization signals on synchronization resources made available based at least in part on the reliability alarm; and synchronize with the network based at least in part on the reliability alarm and on the synchronization signals, wherein the reliability alarm comprises a time offset, or the synchronizing is further based at least in part on a time offset received from the second mobile device, or both.

25. The non-transitory computer-readable medium of claim 24, wherein the instructions are further executable by the processor to:
transmit the reliability alarm on the D2D resources allocated for the reliability alarm.

26. The non-transitory computer-readable medium of claim 24, wherein the instructions are further executable by the processor to:
allocate synchronization resources for synchronization based at least in part on the reliability alarm exceeding a threshold.

* * * * *